US007757351B2

(12) United States Patent
Davis, Jr.

(10) Patent No.: US 7,757,351 B2
(45) Date of Patent: Jul. 20, 2010

(54) SANITARY WIPE AND WIPE DISPENSER FOR DOOR KNOBS

(75) Inventor: Ernest Davis, Jr., Ithaca, NY (US)

(73) Assignee: Ernest M. Davis, Jr., Houston, TX (US)

( * ) Notice: Subject to any disclaimer, the term of this patent is extended or adjusted under 35 U.S.C. 154(b) by 72 days.

(21) Appl. No.: 11/555,738

(22) Filed: Nov. 2, 2006

(65) Prior Publication Data

US 2007/0107162 A1 May 17, 2007

Related U.S. Application Data

(60) Provisional application No. 60/732,955, filed on Nov. 3, 2005.

(51) Int. Cl.
*A47J 45/00* (2006.01)

(52) U.S. Cl. .............................. 16/412; 16/904; 221/45; 221/46; 221/63

(58) Field of Classification Search ................... 16/412; 2/16, 158, 159; 128/878; 206/303, 69, 409, 206/802; 150/155
See application file for complete search history.

(56) References Cited

U.S. PATENT DOCUMENTS

| | | | | |
|---|---|---|---|---|
| 3,314,746 | A * | 4/1967 | Millar | 422/186 |
| 4,978,095 | A * | 12/1990 | Phillips | 248/312 |
| 5,008,551 | A * | 4/1991 | Randolph | 250/462.1 |
| 5,944,220 | A * | 8/1999 | Garske et al. | 221/312 A |
| 5,975,083 | A * | 11/1999 | Henderson, Jr. | 128/878 |
| 5,987,645 | A * | 11/1999 | Teaster | 2/159 |
| 6,189,730 | B1 * | 2/2001 | McClymonds | 221/46 |
| 6,213,424 | B1 * | 4/2001 | Helfer-Grand | 242/564.1 |
| 6,298,521 | B1 * | 10/2001 | Butterfield | 16/412 |
| 6,508,383 | B2 * | 1/2003 | Lidahl et al. | 221/97 |
| 6,543,640 | B2 * | 4/2003 | Russo | 221/34 |
| 6,546,594 | B1 * | 4/2003 | Wills | 16/412 |
| 6,789,695 | B1 * | 9/2004 | Gaudreau | 221/102 |
| 6,874,697 | B2 * | 4/2005 | Callueng | 239/1 |
| 6,912,728 | B2 * | 7/2005 | Panella | 2/16 |
| 6,964,395 | B1 * | 11/2005 | Lewis et al. | 242/593 |
| 7,320,418 | B2 * | 1/2008 | Sassoon | 222/649 |
| 2001/0038016 | A1 * | 11/2001 | Russo | 221/45 |
| 2003/0080018 | A1 * | 5/2003 | Nally | 206/494 |
| 2004/0020815 | A1 * | 2/2004 | Panella | 206/440 |

* cited by examiner

*Primary Examiner*—Victor Batson
*Assistant Examiner*—Matthew Sullivan
(74) *Attorney, Agent, or Firm*—Miller, Matthias & Hull

(57) ABSTRACT

The present disclosure relates to a wipe-dispensing device that can fit around commonly used doorknobs or door handles, and a method for issuing wipes from the device so that they may be used as a protective barrier between the hand and the doorknobs. The device may include a molded circular ring made of plastic or any suitable hardened polymer. The ring fits around a doorknob or door handle so that the inner edge of the ring is proximal to the outer edge of the doorknob base which is fixed to the door. Commonly used adhesive can be applied to the bottom half of the device to allow the apparatus to be attached to a door and to be positioned proximate to a doorknob as mentioned above. The device may also be attached to a door with screws inserted through the device. In an alternative embodiment, a gap can be included in the apparatus so that the ring is not continuous.

12 Claims, 5 Drawing Sheets

SANITARY WIPE AND WIPE DISPENSER FOR DOOR KNOBS

CROSS-REFERENCE TO RELATED APPLICATION

This application is a non-provisional patent application claiming the priority benefits under 35 USC 119(e) of provisional patent application Ser. No. 60/732,955, filed on Nov. 3, 2005.

BACKGROUND OF THE DISCLOSURE

In modern buildings, entry into and exit out of the various rooms of the building is normally achieved with the opening and closing of doors. Such doors typically include a doorknob, door handle or other device that unlatches the door structure from a door jamb or flame. Doorknobs and door handles are typically engaged with bare hands, and as bare hands can carry bacteria and viruses, such bacteria and viruses can thereby be spread to other facility users.

Influenza viruses, for example, are carried on doorknobs and door handles, and according to the U.S. Center for Disease Control, such viruses affect 5% to 20% of the U.S. population each year. The CDC also estimates that more than 200,000 people a year are hospitalized due to flu complications, and approximately 36,000 die from influenza related infection. Several viruses, including influenza viruses, can enter the body when hands that have previously touched an infected door assembly also touch the mouth or nose.

This situation is particularly problematic with public bathrooms. Again, entry into and exit out of such rooms is controlled by door knobs employed by all users. However, as those door knobs are used by people after using the facilities of the bathroom, the risk of spreading bacteria and viruses is particularly acute. The psychological component of people simply not wanting to physically touch a bathroom doorknob, for both real and imagined reasons, also weighs heavily on the minds of many users.

One attempt at addressing these concerns is disclosed in U.S. Pat. No. 6,298,521. It discloses a ring of subliminable disinfectant that slowly vaporizes thereby slowly coating the door knob with disinfectant. However, the user must still physically engage the door handle. Aside from the personal displeasure in doing so, the effectiveness of the '521 patent is dependent on the type of disinfectant used which invariably cannot kill all germs, bacteria, and viruses communicated thereto.

Since a variety of potentially harmful bacteria and viruses are regularly exchanged via doorknobs and handles, and given the health risks and concerns associated with such transfers, there is a need to provide devices and methods that can help reduce exposure to high usage items such as doorknobs and door handles that are infected with harmful bacteria, viruses and a host of other potentially dangerous microorganisms.

SUMMARY OF THE DISCLOSURE

The present disclosure, therefore, in one aspect, relates to a wipe-dispensing device that can fit around commonly used doorknobs or door handles, and a method for issuing wipes from the device so that they may be used as a protective barrier between the hand and doorknobs or handles. The invention allows for dispensing of wipes over and/or around doorknobs and handles at the point of use, thus facilitating increased utilization of wipes for such door components.

One embodiment includes a molded circular ring made of plastic or any suitable hardened polymer. The ring fits around a doorknob or door handle so that the inner edge of the ring is proximal to the outer edge of the doorknob base which is fixed to the door. Commonly used adhesive can be applied to the bottom half of the device, thus allowing the apparatus to be attached to a door and to be positioned proximal to a doorknob as mentioned above. The device may also be attached to a door with screws inserted through the bottom half of the device, or can be manufactured from metal.

In accordance with one aspect of the disclosure, a system for sanitizing door handles is disclosed which comprises a housing adapted to be mounted proximate the door handle and a supply of sanitary barriers provided within the housing.

In accordance with another aspect of the disclosure, a dispenser for sanitizing door handle barriers is disclosed which comprises a cylindrical base and a cylindrical cover. The cylindrical base is adapted to fit around a door handle and be fixed to a door to which the door handle is attached and includes a rear wall from which inner and outer cylindrical walls forwardly extend, the inner cylindrical wall having a diameter sufficiently large to accommodate a door handle, the cylindrical cover is removably attached to the cylindrical base. The cylindrical cover includes a front wall from which inner and outer cylindrical walls rearwardly extend, a diameter of the cover outer wall being equal to a diameter of the base outer wall. A diameter of the cover inner wall is greater than a diameter of the base inner wall, the cover front wall, outer wall, and inner wall, and the base rear wall and outer wall form a storage compartment for a supply of barriers. The cover inner wall and base inner wall from a dispensing aperture for the supply of barriers.

In accordance with yet another aspect of the disclosure, a method of forming a sanitizing barrier between a hand and a door handle is disclosed, which comprises providing a housing around the door handle, positioning a supply of sanitary barriers in the housing, grasping one of the sanitary barriers and pulling the barrier over the door handle, rotating the door handle with the barrier between the hand and the handle, opening the door, further pulling the barrier away from the housing with the barrier thereby releasing from the supply of the barriers, releasing the door handle while retaining the barrier in the hand, and discarding the barrier.

In an alternative embodiment, a gap can be included in the apparatus so that the ring is not continuous.

These and other aspects, features, and advantages of the present disclosure will be discussed in further detail below in conjunction with the accompanying drawings.

Figure 1:
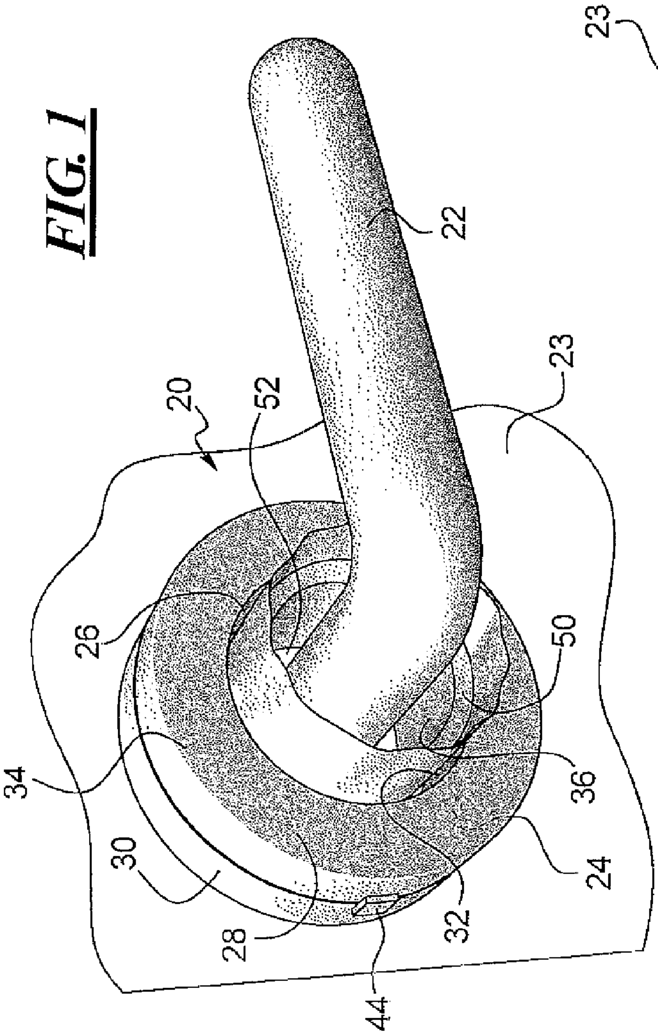
FIG. 1 is a perspective view of a dispenser constructed in accordance with the teachings of the disclosure and mounted to a door.
Figure 2:
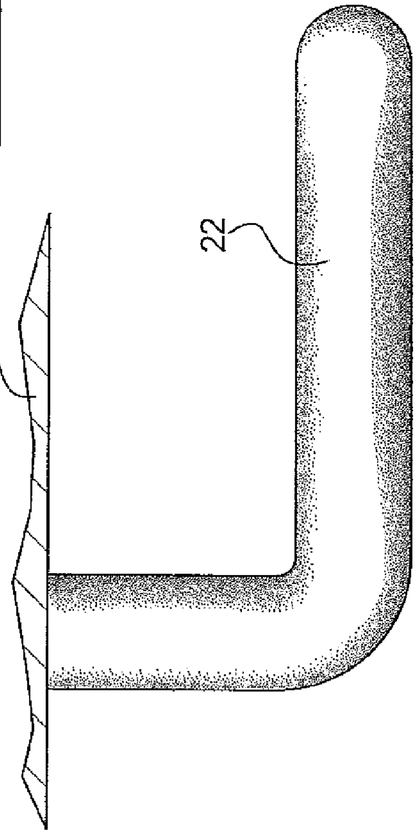
FIG. 2 is a top view of the door knob of FIG. 1.

While the present disclosure is susceptible to various modifications and alternative constructions, certain illustrative embodiments thereof have been shown in the drawings and will be described below in detail, It should be understood, however that there is no intention to limit the present disclosure to the specific forms disclosed, but on the contrary, the intention is to cover all modifications, alternative constructions, and equivalents falling within the spirit and scope of the present disclosure.

DETAILED DESCRIPTION OF THE DISCLOSURE

Referring now to the drawings and with specific reference to FIG. 1, a dispenser constructed in accordance with the teachings of the disclosure is generally referred to by reference numeral 20. As shown therein, the device 20 is adapted to fit around a doorknob 22 of conventional lever design extending from a door 23. In other embodiments, the device 20 could be used in conjunction with circular, cylindrical, or spherical knobs and levers, or the like. In any of such embodiments, the device 20 is positioned proximate the knob 22 such that the user never needs to have direct interface or engagement with the knob 22 and thus is always provided with a protective barrier therebetween.

Figure 6:
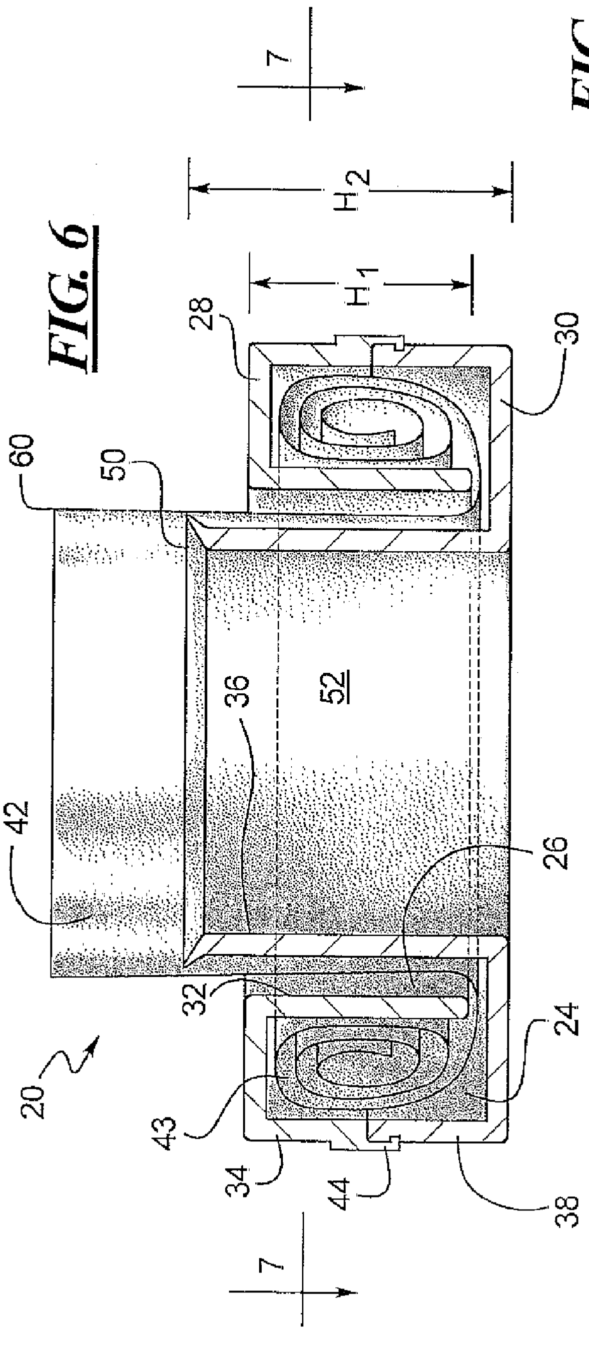
FIG. 6 is a sectional view of the dispenser of FIG. 5 taken along line 6-6 of FIG. 5.
Figure 7:
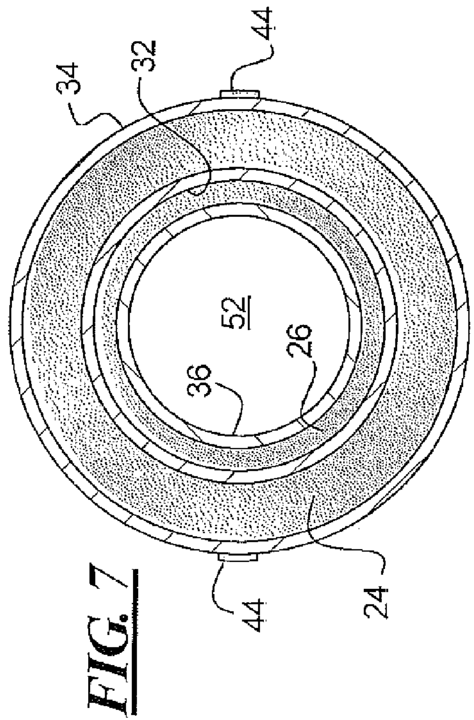
FIG. 7 is a sectional view of the dispenser of FIG. 6 taken along line 7-7 of FIG. 6.
Figure 8:
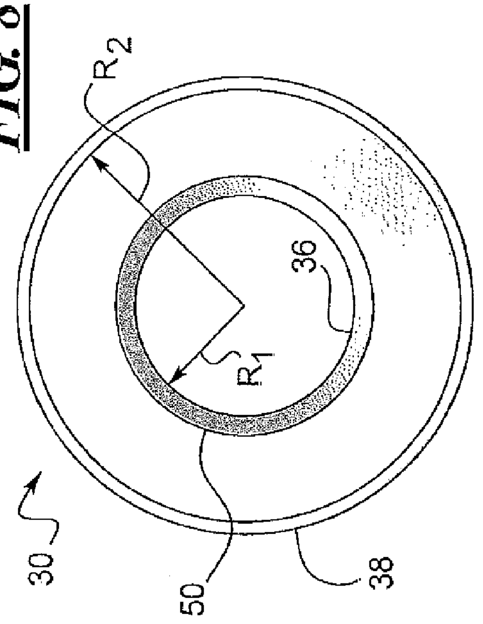
FIG. 8 is a top view of a bottom section of the dispenser.
Figures 9, 10, 11:
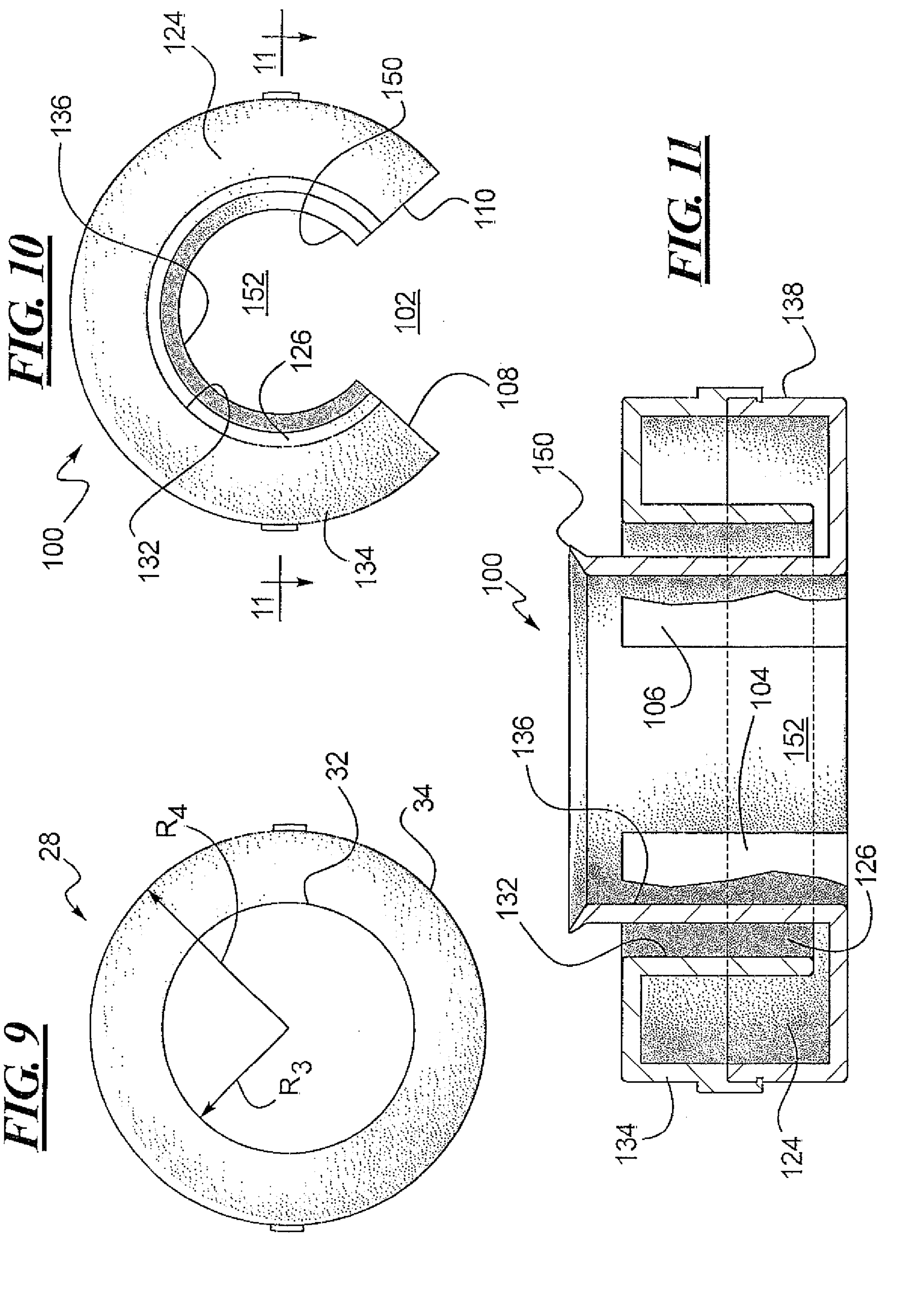
FIG. 9 is a top view of a top section of the dispenser.
FIG. 10 is a plan view of an alternative dispenser.
FIG. 11 is a sectional view of the dispenser of FIG. 10 taken along line 11-11 of FIG. 10.

The device 20 may be annular or ring-shaped and include hollow cavities 24, 26 which are formed by the cooperation of a top device half 28 and a bottom device half 30 of the device 20. As shown in FIGS. 8 and 9, this is accomplished in one embodiment by making the distance (R4-R3) between inner wall 32 and outer wall 34 of the top half 28 of the ring 20 smaller than the distance (R2-R1) between the inner wall 36 and outer wall 38 of the bottom half 30 of same. Moreover, the innermost walls 32, 36 of each half are different heights, as shown in FIG. 6 by reference elements H1, and H2. Thus, when the top and bottom halves 28, 30 are secured to one another, the annular storage and dispensing areas or cavities 24, 26 are created inside of the device 20 for holding and dispensing strips of paper or film 42 that can be as thick or as thin as desired.

Figure 3:
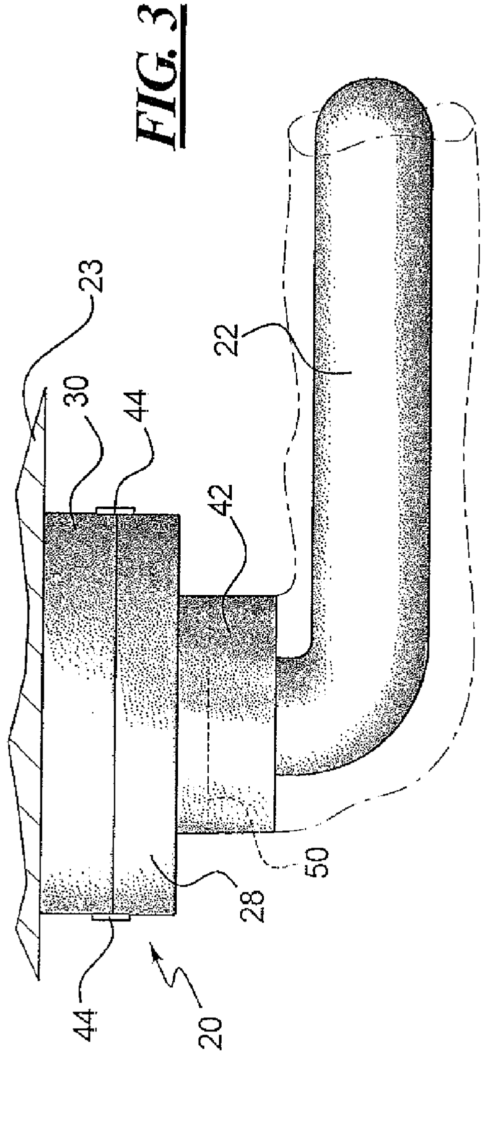
FIG. 3 is a top view of the door of FIG. 1 with a dispenser mounted thereto.
Figure 4:
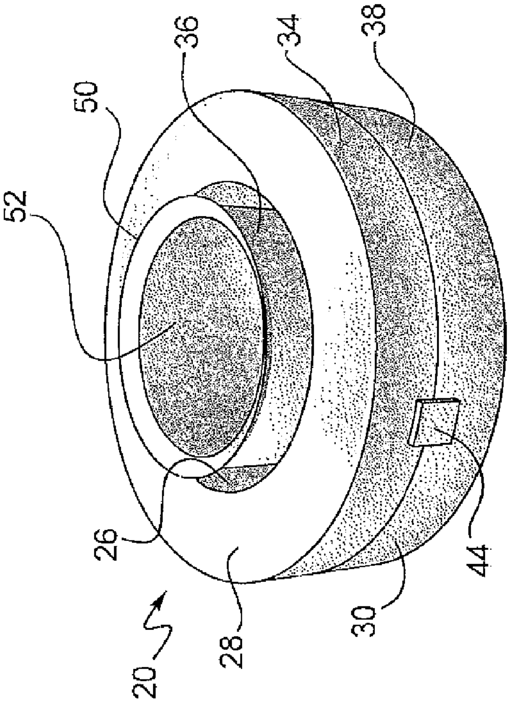
FIG. 4 is a perspective view of the dispenser.
Figure 5:
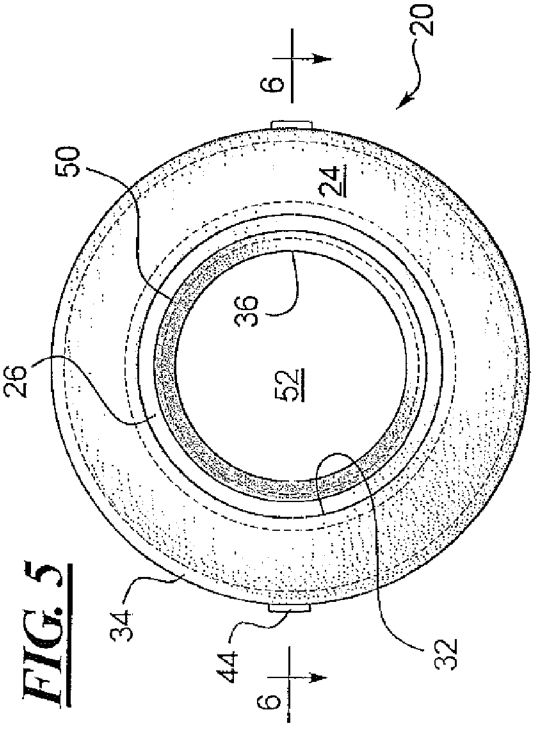
FIG. 5 is a plan view of the dispenser.

The strips 42 may be rolled or folded, separated by perforations, or packaged in an interlocked stack 43 such that when one is pulled out or dispensed, the adjoining or interlocking strip is pulled out sufficiently for subsequent use. Furthermore, the strips 42 housed in the dispenser 20 can have a predetermined length. In the preferred embodiment, the aforementioned top and bottom ring halves 28, 30 are pressed and held together with a standard latch mechanism 44. When said halves 28, 30 are latched, the aforementioned strips 42 may be held in storage cavity 24 and dispensed from dispensing cavity 26 which are formed by the wall configurations described above. In the preferred embodiment, the strips 42 can be dispensed through the cavity 26 positioned near the innermost wall 36 of the device 20. In one embodiment, the strips could have a cylindrical shape when deployed as shown in FIG. 3

Perforations in rolled paper or film 42 may be positioned along the material so that the distance between perforated lines (which defines the length of a single piece of material) is great enough to allow a single strip 42 to cover an entire doorknob 22, or any portion of same. Perforations may not be necessary for folded or interlocked paper which can be housed in the device. The actual material for the strip may be paper or plastic in nature, with paper of facial tissue grade being one example. Such paper may be dry or moistened with a disinfectant, fragrance, moisturizer, or the like. The strips 42 may be mounted about a central core (not shown) in the cavity 24 or could be mounted without a core. The core may be torus-shaped with a circular cross-section similar to the cross-section of paper towels or toilet paper cores. The innermost strip proximal to the core may be free or attached to the core. In other embodiments, the strips 42 need not be mounted to any core, but rather can be positioned within the cavity without any supporting structure.

On the innermost wall 36, a lip 50 of the device 20 is positioned such that the lip 50 protrudes away from a door surface. The lip 50 enables easier separation of perforated, folded or interlocked strips 42 housed in the device in that as the material is pulled out of the device, the strips 42 are pulled across the lip 50 which acts as a cutting surface or knife. The device 20 further includes a central aperture 52 for receipt of the door knob 22 therethrough.

In an alternative embodiment of the disclosure shown in FIGS. 10 and 11, the device may be a discontinuous ring 100, with the discontinuity being created by a gap 102 which can vary in size. Flat walls 104, 106 at the ends 108, 110 of the discontinuous ring 100 define the gap 102 in the ring 100. Such walls 104, 106 prevent slight movements and rotations of the paper strips (not shown) housed in the apparatus cavity 124 which might otherwise occur due to the rotating, twisting motion associated with doorknob or door handle use. The gap 102 in the discontinuous ring 100 can also prevent the device from overhanging a nearest door edge (not shown). Furthermore, the discontinuous ring configuration can also enable placement of the device on a door without interference of non-spherical doorknobs, or interference of door handles which extend first perpendicularly and then parallel to the plane of a door surface. All other elements are identical to the first embodiment, and are labeled with the same reference numeral preceded by a one hundred series prefix.

Figure 12:
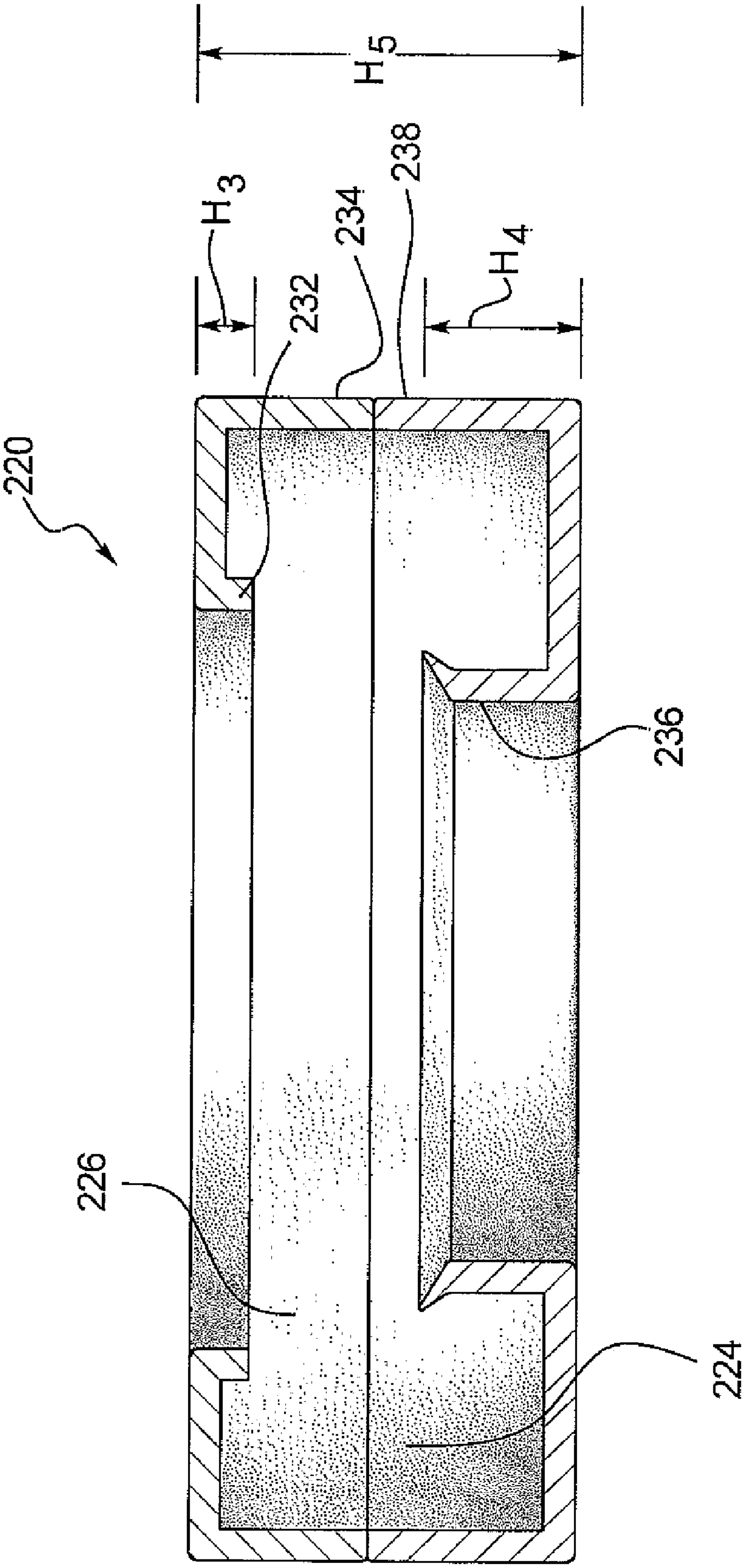
FIG. 12 is a sectional view of another alternative embodiment.

A still further alternative embodiment of the device 220 is depicted in FIG. 12. As shown therein, an inner wall 232 is substantially shorter (as shown by dimension $H_3$) than either the height of inner wall 236 (As shown by dimension $H_4$), or the combined outer walls 234 and 238 (depicted as dimension $H_5$). Accordingly, barriers (not shown) would be stored in chamber 224 and dispersed through opening 226

A method for using the device and for providing a protective barrier between a hand and a doorknob/handle in conjunction with the present disclosure is now described below.

In a first step, the bottom half 30 of the device 20 is adhered, screwed, or otherwise fastened to a door 23. In a second step, paper or film material 42 is inserted into the top half 28 or bottom half 30, with the material 42 being positioned so that a leading edge 60 of a first strip 42 is visible. Next, the top half 28 is secured to the bottom half 30 with the latching mechanism 44 and the leading edge of the material is fed along the innermost wall 36 of the device. The user then pulls the paper or film material 42 over the doorknob/handle 22 and over the lip 50 of the device 20. The user then grasps the doorknob 22 with the material 42 between the doorknob and the hand, and twists the doorknob to unlatch the door from the door jamb or frame. In doing so, a single piece of material 42 is separated from other pieces housed in the device as the doorknob is turned. The user then lets go of the doorknob 22 while retaining the strip 42 in his or her hand and the strip 42 is discarded with the user never directly contacting the doorknob 22.

While the preceding disclosure has been given with reference to a particular type of doorknob, it is to be understood that the disclosure relates to all types of doorknobs and door handles and the provision of a protective barrier therebetween. Accordingly, it can be seen that embodiments of the device and method of this invention can accommodate a range of door types and door opening mechanisms. With regard to the housing for the wipes, again only two embodiments have been depicted, but it is to be understood that the scope of the disclosure includes any structure adapted to hold wipes proximate to or around a door handle, knob, or lever as well as any structure and method for protecting the hands of a user from ever directly engaging such door handles, knobs and levers. Such housings could be mounted on the door, or a location near the door.

What is claimed is:

1. A dispenser for sanitizing door handle barriers, comprising:

a cylindrical base adapted to fit around a door handle and be fixed to a door to which the door handle is attached, the cylindrical base having a rear wall from which inner and outer cylindrical walls forwardly extend, the inner cylindrical wall having a diameter sufficiently large to accommodate a door handle; and a cylindrical cover removably attached to the cylindrical base, the cylindrical cover including a front wall from which inner and outer cylindrical walls rearwardly extend, a diameter of the cover outer wall being equal to a diameter of the base outer wall, a diameter of the cover inner wall being greater than a diameter of the base inner wall, the cover front wall, outer wall, and inner wall, and the base rear wall and outer wall forming a storage compartment for a supply of barriers, the cover inner wall and base inner wall forming a dispensing aperture for the supply of barriers, the base inner wall including a front edge that extends further away from the base rear wall than does the cover front wall.

2. The dispenser for sanitary door handle barriers of claim 1, wherein the base inner wall includes a front edge that is closer to the base rear wall than the cover front wall.

3. The dispenser for sanitizing door handle barriers of claim 1, wherein the base inner wall forward edge terminates in a radially extending, cylindrical cutting edge.

4. The dispenser for sanitary door handle barriers of claim 1, wherein the base inner wall and cover inner wall are different heights.

5. The dispenser of claim 1, wherein the supply of sanitary barriers are stacked in interlocking fashion.

6. The dispenser of claim 1, wherein the supply of sanitary barriers is provided in interconnected web fashion, each sanitary barrier being separated by a line of perforations.

7. The dispenser of claim 1, wherein the housing includes a plurality of concentric, cylindrical walls.

8. The dispenser of claim 1, wherein the outer and middle concentric, cylindrical walls form a storage compartment for the supply of sanitary barriers.

9. The system of claim 8, wherein the inner wall forms a central aperture adapted to receive the door handle therethrough.

10. The system of claim 9, wherein the inner wall includes a forward ridge that terminates in a beveled cutting rim.

11. The system of claim 9, wherein the housing includes forward and rearward clam shell halves, the rearward half being fixed to the door, the forward half being removably attached to the rearward half to allow for replacement of the supply of sanitary barriers.

12. The system of claim 11, wherein the forward clam shell half includes the middle wall and a portion of the outer wall, and wherein the rearward clam shell half includes the inner wall and a remaining portion of the outer wall.

* * * * *